United States Patent

[11] 3,626,789

| [72] | Inventors | Hans W. Winter;<br>Karl Grimpe, both of Duisburg, Germany |
|---|---|---|
| [21] | Appl. No. | 868,309 |
| [22] | Filed | Oct. 22, 1969 |
| [45] | Patented | Dec. 14, 1971 |
| [73] | Assignee | Demag A.G.<br>Duisburg, Germany |
| [32] | Priority | Nov. 25, 1968 |
| [33] | | Germany |
| [31] | | P 18 10 772.7 |

[54] AXIAL SUPPORT FOR A PLANETARY GEARING
1 Claim, 2 Drawing Figs.

[52] U.S. Cl. .................................................. 74/801, 74/410
[51] Int. Cl. .................................................. F16h 1/28
[50] Field of Search ................................. 74/410, 801

[56] References Cited
UNITED STATES PATENTS

| 1,225,360 | 5/1917 | Royce ........................... | 74/801 |
| 2,759,376 | 8/1956 | Chamberlin et al. ......... | 74/801 |
| 2,953,040 | 9/1960 | Christenson et al. ......... | 74/801 X |
| 2,968,922 | 1/1961 | Gilbert ........................ | 74/801 X |

FOREIGN PATENTS

| 229,784 | 10/1959 | Australia ...................... | 74/801 |
| 903,495 | 8/1962 | Great Britain ................ | 74/801 |

Primary Examiner—Carlton R. Croyle
Assistant Examiner—Thomas C. Perry
Attorneys—John J. McGlew and Alfred E. Page ABSTRACT: An axial support for a planetary gearing includes a planet gear carrier for rotatably supporting one or more planet gears for meshing engagement with a central sun gear. The sun gear is connected through a universal connection to a driving shaft. The sun gear is freely supported on a rod member which is affixed to the planet gear carrier but which permits axial displacement of the sun gear between a collar and a spacer member arranged around the rod adjacent the respective ends of the sun gear. A clutch sleeve, engaged between the drive shaft and the sun gear, permits universal movement of the shaft. In a further embodiment, the supporting rod for the sun gear is rotatably mounted within the planet gear carrier and rotatably supports the sun gear without any axial displacement. The rotatable bearings are pendulum-type bearings.

Patented Dec. 14, 1971 3,626,789

Inventors
HANS WINTER
KARL GRIMPE

BY
McGlew & Toren
ATTORNEYS

AXIAL SUPPORT FOR A PLANETARY GEARING

SUMMARY OF THE INVENTION

This invention relates in general to axial suspensions and, in particular, to a new and useful axial mounting for a sun gear of a planetary gear system.

It is a known practice to fix the nonsuspended and self-adjustable sun pinion, which is connected through a single or double joint clutch to a drive or driven shaft, by means of snaprings which are located at spaced locations on the mounting rod element so that the sun gear will move with a small axial play but there will be no impairment of the self-adjustability of the sun gear. The clutch sleeve which extends between the sun pinion and driving shaft is also mounted so that it will have only a slight axial displacement similar to the sun gear. This known construction has several known disadvantages:

a. Because of the direct axial connection of the sun pinion gear of the clutch sleeve and of the motor shaft, the axial adjusting movement of the drive motor is transmitted to the individual gear members. Therefore the motion gear system of the sun pinion may be displaced from its ideal position.

b. The axial position of the sun pinion is determined by the axial position of the motor rotor or of the motor itself. The motor alignment must be effected very carefully particularly for the reason that, in an enclosed transmission, the position of the sun pinion cannot be checked or it can only be checked with great difficulty. In addition, other installation faults which are compensated by the joint clutch can be accommodated only by a costly construction, namely by use of wider planet wheels.

c. The recesses on the respective parts, which are required for the snaprings, increase the structural length of the clutch pinion connection and hence the entire transmission with resulting disadvantages.

d. When snaprings which are engaged in the supporting rod or shaft in grooves are employed, there is the danger that they may be pushed out of their associated grooves and that they may be become jammed in the gear teeth, causing damage to the teeth.

In accordance with the present invention there is provided a mounting for a sun gear of a planetary gear system on a rod member or shaft which permits its universal driving connection through a clutch member to a drive shaft while maintaining the gear in proper alignment with the planetary gearing. The sun gear is mounted on a rod member to permit its free rotation and engagement with the associated planetary gearing but with some axial play. In one embodiment the sun gear is rotatably supported on a rod member which is affixed to the carrier and the rod member is provided with an end collar at one end which limits axial movement in the direction of the drive shaft. In addition there is a spacer on the other end which limits axial movement of the sun pinion in respect to the planet carrier which supports the rod member. In another embodiment, the sun gear is rotatably supported on the rod member by pendulum bearings arranged at spaced locations along the supporting rod member. This mounting permits some axial displacement of the sun gear without requiring snaprings but nevertheless permits a stable axial connection between the sun gear and the associated planetary gearing. The arrangement is such that the sun gear is self-adjustable and is relatively uninfluenced by the joint clutch which engages with a gear tooth portion adjacent one end and is also engageable with a geared portion on the drive shaft.

Accordingly, it is an object of the invention to provide an improved construction for mounting the sun gear of a planetary gear system in which the drive shaft is connected to the sun gear through a universal clutch joint construction.

A further object of the invention is to provide a means for rotatably supporting a sun gear on a rod member, and which includes a collar at one end and a spacer adjacent the other end for limiting axial movement of the sun gear or alternatively includes pendulum bearings for mounting the sun gear.

A further object of the invention is to provide a mounting for a sun gear of a planetary system which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
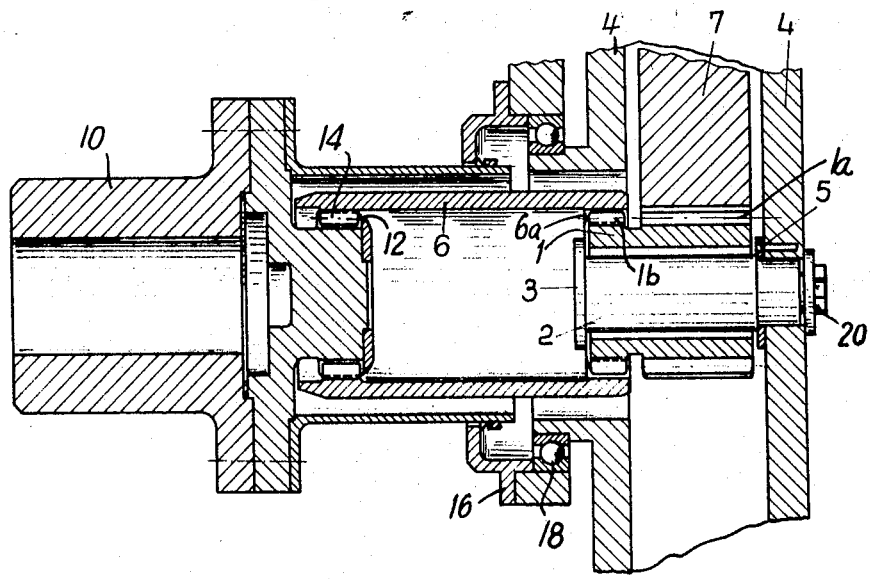
FIG. 1 is a partial longitudinal sectional view of a planetary gear system constructed in accordance with the invention.

Referring to the drawings in particular, the invention embodied as shown in FIG. 1 includes a drive shaft 10 having an end portion with a gearing 12 which engages with corresponding gearing 14 of an axially movable sleeve member 6. The drive shaft is supported on a fixed member or housing 16 which also rotatably supports a planetary gear carrier 4 on bearings 18.

In accordance with the invention the planetary gear carrier 4 rotatably supports a plurality of planet gears 7 which are in meshing engagement with drive gearing 1a of a sun gear or sun pinion 1. The sun pinion 1 is freely rotatable on a rod member or rod 2 having a collar 3 adjacent and the drive shaft end and a spacer 5 which is affixed to the planet carrier 4. The rod member 2 is supported in the carrier 4 by bolt means 20 so that it is nonrotatable in respect to the planet carrier 4. The spacer 5 is similarly nonrotatable.

The sun pinion 1 is freely mounted on the rod 2 and is self-adjustable and includes some axial play between the collar 3 and the spacer 5 in order to permit universal movement of the drive shaft 10 relative to the sun gear 1 while maintaining a drive connection through the drive clutch 6. The drive clutch 6 includes gearing 6a which engages with gearing 1b on the sun pinion 1. Collar 3 may be made as an integral part of the rod 2 or may be fastened to the rod 2 as a separate end disc element.

Figure 2:
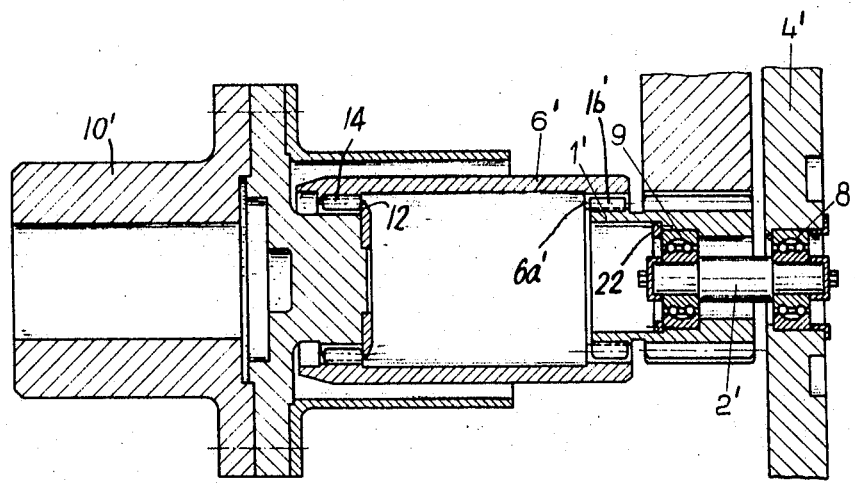
FIG. 2 is a view similar to FIG. 1 of another embodiment of the invention.

In the modification indicated in FIG. 2, a drive shaft 10' is connected to a sun pinion or sun gear 1' through a clutch sleeve 6'. In this embodiment a rod 2' is rotatably supported on the carrier 4' by means a first pendulum bearing 8 and it rotatably supports the sun pinion by means of a second pendulum bearing 9. The rod 2' is mounted in an axially fixed position by the pendulum bearing 8 which is carried in the planet carrier 4' and the bearings 8 and 9 are axially fixed by the associated rod 2' and an associated supporting disc 22 which engages the sun pinion 1'. This construction also permits the universal movement of the drive shaft 10' relative to the sun pinion 1' similar to the other embodiment.

The construction of the invention has the further advantage that during transportation without the clutch sleeve 6, the sun pinion 1 and the planetary gear 7 of the embodiment of FIG. 1 with the end disc 3 and the spacer disc 5 can be moved together in a completely clamped relationship.

What is claimed is:

1. A planetary gearing construction, comprising a drive shaft, a planetary carrier having a planetary gear rotatably supported thereon, a sun gear supporting rod carried by said carrier, a sun pinion arranged freely around said rod engaged with said planetary gear, a clutch drive sleeve engaged with said drive shaft and having gear means drivingly engaged with said sun pinion and permitting universal pivotal movement of said drive shaft relative to said sun pinion, and support means rotatably supporting said sun gear on said rod permitting the tilting and universal connection thereof with said clutch drive sleeve and said drive shaft without disturbing engagement thereof with said planetary gear; said support means including a first pendulum bearing rotatably supporting said rod on said planetary gear carrier, and a second rotatable bearing rotatably supporting said sun pinion in an axially fixed position on said rod.

* * * * *